United States Patent Office 2,948,737
Patented Aug. 9, 1960

2,948,737

PROCESS FOR THE PRODUCTION OF THIOPHENE CARBOXYLIC ACIDS

Bruno Blaser, Dusseldorf-Urdenbach, Werner Stein, Dusseldorf-Holthausen, and Hubert Schirp, Dusseldorf, Germany, assignors to Henkel & Cie, G.m.b.H., Dusseldorf-Holthausen, Germany, a corporation of Germany No Drawing. Filed Mar. 6, 1959, Ser. No. 797,562

Claims priority, application Germany July 30, 1958

6 Claims. (Cl. 260—332.2)

This invention relates to the introduction of carboxyl groups into aromatic sulfurheterocyclic hydrocarbons of the thiophene series to produce aromatic heterocyclic carboxylic acids in the form of their salts. The invention more particularly relates to a direct and selective introduction of carbon dioxide into the aromatic molecule to produce polycarboxylic acids of a symmetrical nature such as thiophene-2,5-dicarboxylic acid.

This selective carboxylation is accomplished by heating the aromatic sulfur-heterocyclic hydrocarbon of the thiophene series in the presence of an acid-binding agent, and a source of carbon dioxide under anhydrous conditions. For example thiophene-2,5-dicarboxylic acid may be produced from thiophene in such a manner.

It is an object of this invention to produce aromatic heterocyclic carboxylic acids by selective carboxylation of aromatic sulfur-heterocyclic hydrocarbons of the thiophene series.

Another object of this invention is to accomplish the direct and selective carboxylation of thiophene to produce thiophene-2,5-dicarboxylic acid.

This and other objects of this invention will become apparent as the description thereof proceeds.

It is known that aromatic monocarboxylic acids may be produced by heating aromatic hydrocarbons and carbon dioxide in the presence of aluminum chloride. This process requires the use of relatively large quantities of aluminum chloride. The yields obtained thereby are meager.

In our copending application Ser. No. 686,007, filed September 25, 1957, we disclose a process for the introduction of carboxyl groups into aromatic hydrocarbons, such as benzene, by heating the same in the presence of carbon dioxide, preferably under pressure and in the presence of acid-binding agents, the heating being preferably carried out in the further presence of those materials which are capable of binding or reacting with the water formed by the reaction. In accordance with said process, for example, we have produced terephthalic acid or trimesic acid from benzene.

We have found that it is possible to introduce carboxyl groups into the aromatic sulfur-heterocyclic hydrocarbons of the thiophene series such as thiophene, thionaphthene or thiophthene and into their hydrocarbon-substituted derivatives such as α-thiotoluene, β-thiotoluene, etc. In this manner, salts of carboxylic acids of the above-mentioned heterocyclic compounds—that is, salts of thiophene-2,5-dicarboxylic acid may be obtained. The salts thus obtained may then be transformed into the corresponding free acids or their derivatives in accordance with well-known methods.

We have now found that carboxyl groups may be introduced into the aromatic sulfur-heterocyclic hydrocarbon compounds of the thiophene series by heating said compounds in the presence of carbon dioxide and in the presence of acid-binding agents, and also advantageously in the presence of materials which are capable of binding or reacting with the water formed during the reaction, to temperatures above 350° C. In accordance with this process, salts of aromatic heterocyclic carboxylic acids are obtained.

It is preferred to use the carbonates of alkali metals, especially potassium carbonate, as the acid-binding agent. Acid-binding agents are those chemical compounds capable of combining to neutralize the acids produced by the reaction. In place of the carbonates, however, the salts of other weak acids may be employed, such as the bicarbonates, formates or oxalates. Similarly, the corresponding compounds of other metals are suitable, such as the carbonates of the alkali earth metals.

The starting materials are preferably heated in the presence of those materials which are capable of binding or reacting with the water formed by the reaction without interfering with the reaction proper. Such materials include, for example, the carbides of various metals, such as aluminum carbide, or also the carbides of alkali earth metals or alkali metals, such as calcium carbide. Furthermore, other compounds of the above-mentioned metals, for example their nitrides, are suitable for this purpose. Free metals which are capable of reacting with water at the prevailing temperatures, such as aluminum, may also be used as the water-binding agent. The water formed by the reaction may also be tied up by other methods, for example, with the aid of alkali metal carbonates, especially potassium carbonate, which must in this case be present in substantial excess above the amount required for the neutralization of the carboxylic acids formed by the reaction.

The starting materials are heated in the presence of carbon dioxide, preferably under pressure. The quantitative ratio of carbon dioxide and aromatic sulfur-heterocyclic hydrocarbons such as thiophene may vary within wide limits. In place of carbon dioxide, other gas mixtures may be employed which contain inert gases, such as nitrogen, methane or argon, in addition to carbon dioxide. The presence of substantial amounts of oxygen should advantageously be avoided.

The reaction generally begins to proceed at a temperature of about 300° C. The optimum reaction temperature, however, may vary, depending upon the starting materials used. The upper temperature limit for the process is determined only by the decomposition temperature of the reaction products.

If the above-described starting materials are solids, they are used in this process preferably in a dry and finely divided form and intimately admixed with each other. In order to achieve as complete a reaction of the starting materials as possible, it is advantageous to maintain the reaction mixture in motion by stirring or agitating the reaction vessel. In addition, it is advantageous to admix the solid components with inert additives which have a large surface or to apply these solid starting materials to substances having a larger outer surface. Suitable such inert additives are, for example, asbestos, pumice stone, mineral wool, glass wool, finely divided silicic acid or finely divided aluminum oxide, kieselguhr or inert salts, such as sodium sulfate and the like.

We have further found that in order to achieve good yields the presence of catalysts is required. Suitable catalysts include especially the heavy metals, cadmium, zinc, mercury, iron or lead, as well as compounds of these metals, such as their oxides or their salts formed with organic or inorganic acids. Cadmium salts are preferred. The amount of catalyst added to the reaction mixture may vary within wide limits.

As a rule, the reaction mixture may be worked up in a very simple manner. For example, in the production of thiophene-2,5-dicarboxylic acid from thiophene, the solid components of the reaction mixture may be separated from excess thiophene and can thereafter be dissolved in water. After filtering off insoluble components, the dicarboxylic acid may be precipitated from the aqueous solution in accordance with known methods by acidifying the solution with inorganic or organic acids. The unreacted thiophene can, as a rule, be recovered practically quantitatively, so that the process in general produces practically no side reaction products and gives very good yields. In the performance of the process on an industrial scale, the heterocyclic compounds serving as the starting material may be recycled. The same is true of the carbon dioxide, which can be used over again after a suitable purification, if necessary. Similarly, the other additives, such as the catalyst or the inert additives having a large surface area, may be repeatedly used.

The following examples will enable persons skilled in the art to better understand and practice the invention and are not intended to limit the invention.

*Example I*

A mixture of 27.6 gm. of potassium carbonate, 1.0 gm. cadmium fluoride and 10.0 gm. finely milled aluminum carbide was heated together with 150 cc. of thiophene in an autoclave having a net volume of 600 cc. for 16 hours at 340° C. Prior to heating the autoclave, carbon dioxide was introduced therein under pressure until the internal pressure at the reaction temperature (340° C.) reached a maximum of 1570 atmospheres. After cooling and releasing the pressure from the autoclave, the solid reaction product was separated from the excess thiophene by filtration and the filter cake was dissolved in hot water. Subsequently, the aqueous solution was filtered to separate insoluble components, such as the catalyst and aluminum oxide or hydroxide, and the filtrate was acidified with hydrochloric acid. Upon cooling the acidified solution, 2.6 gm. of thiophene-2,5-dicarboxylic acid crystallized out. An additional 1.3 gm. of the same acid were obtained by extraction of the mother liquor with ether. The total of 3.9 gm. represents a yield of 8% of theoretical based on the limiting potassium carbonate.

In the like manner thionaphthene, thiotoluene or thiophthene can be treated with carbon dioxide to produce dicarboxylic acid derivatives.

While we have described particular embodiments of our invention, it will be understood that the invention is not limited thereto and that various modifications and adaptations thereof may be made without departing from the scope of the invention as set forth in the above disclosure and the following claims.

We claim:

1. A process for the introduction of carboxyl groups into thiophene which comprises heating thiophene under anhydrous conditions to a temperature above 300° C. and below the temperature at which substantial decomposition of the starting material and reaction products takes place in the presence of carbon dioxide and an alkali-metal carbonate and recovering thiophene-2,5-dicarboxylic acids in the form of their alkali metal salts.

2. A process for the introduction of carboxyl groups into thiophene which comprises heating thiophene to a temperature above 300° C. and below the temperature at which substantial decomposition of the starting material and reaction products takes place in the presence of carbon dioxide, an alkali-metal carbonate and a compound capable of binding the water produced by the reaction selected from the group consisting of carbides and nitrides of aluminum, carbides and nitrides of alkali metals, carbides and nitrides of alkaline earth metals, and alkali metal carbonates in excess of that required for the neutralization of the carboxyl groups formed during the reaction and recovering thiophene-2,5,-dicarboxylic acids in the form of their salts.

3. The process of claim 2 wherein the reaction is carried out under superatmospheric pressure in the presence of a heavy metal catalyst selected from the group consisting of cadmium, zinc and compounds thereof.

4. The process of claim 2 wherein the reaction is carried out in the presence of a solid inert diluent.

5. The process of claim 3 wherein said alkali-metal carbonate is potassium carbonate and said compound capable of binding the water produced is aluminum carbide.

6. A process for the production of thiophene-2,5-dicarboxylic acid which comprises heating thiophene to a temperature above 300° C. under superatmospheric pressure in the presence of excess carbon dioxide, potassium carbonate, aluminum carbide, and a small amount of a cadmium salt and recovering thiophene-2,5-dicarboxylic acid.

No references cited.